United States Patent
Brisson et al.

(10) Patent No.: US 6,811,375 B2
(45) Date of Patent: Nov. 2, 2004

(54) RAISED SEALING SURFACE PLATFORM WITH EXTERNAL BREECH RING LOCKING SYSTEM FOR A BRUSH SEAL IN A TURBINE AND METHODS OF INSTALLATION

(75) Inventors: Bruce William Brisson, Galway, NY (US); David Alan Caruso, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 10/284,331

(22) Filed: Oct. 31, 2002

(65) Prior Publication Data

US 2004/0086381 A1 May 6, 2004

(51) Int. Cl.[7] ................................................ F01D 11/00
(52) U.S. Cl. ................................ 415/173.7; 415/174.2; 415/231
(58) Field of Search .......................... 415/173.7, 174.2, 415/174.5, 231; 277/335, 637

(56) References Cited

U.S. PATENT DOCUMENTS 6,168,377 B1    1/2001  Wolfe et al.
6,290,232 B1 *  9/2001  Reluzco et al. ............. 277/355
6,558,118 B1 *  5/2003  Brisson et al. ........... 415/173.7
6,692,228 B2 *  2/2004  Turnquist et al. ........ 415/174.2

* cited by examiner

Primary Examiner—Ninh H. Nguyen
(74) Attorney, Agent, or Firm—Nixon & Vanderhye (57) ABSTRACT

In the diaphragm packing area of a steam turbine, a raised platform affords an annular sealing surface for contact with a brush seal carried by the diaphragm. The platform includes a plurality of platform sealing segments secured to a locking device carried by the rotor. The locking device includes a raised rim having flanges with axially oppositely projecting teeth circumferentially spaced one from the other by slots. The platform segments each include a channel section having flanges with axially inwardly directed teeth. By displacing the platform sealing segments radially inwardly and passing the teeth of the locking device and platform segments through the respective slots, the platform segment teeth lie radially inwardly of the locking device teeth. The platform segments are then rotated radially to align the teeth to secure the sealing surface against radial movement. One segment may be staked, welded or screwed to the locking device to preclude circumferential movement during turbine operation.

5 Claims, 9 Drawing Sheets

RAISED SEALING SURFACE PLATFORM WITH EXTERNAL BREECH RING LOCKING SYSTEM FOR A BRUSH SEAL IN A TURBINE AND METHODS OF INSTALLATION

The present invention relates generally to brush seals for sealing between a turbine rotor and a stationary component about the rotor and particularly relates further to a method of attachment for a raised platform sealing surface provided on the rotor for engagement by the tips of the bristles of the brush seal whereby rotor dynamic and thermal constraints on the use of brush seals in diaphragm packing areas of the steam turbine are overcome.

BACKGROUND OF THE INVENTION

As explained in detail in U.S. Pat. No. 6,168,377B1 of common assignee, it is desirable to employ brush seals for sealing between the turbine rotor and the stationary rotor casing since brush seals have demonstrably improved sealing characteristics as compared with labyrinth type seals typically used at those seal locations. However, rotor dynamic and thermal constraints inhibit use of brush seals for example in the diaphragm packing area of a turbine. Localized rotor heating due to the friction caused by the bristles of the brush seal rubbing on the rotor surface magnifies the effects of rotor vibrations through the first and second critical speeds resulting in unacceptable radial rotor movement. For example, impulse design steam turbines typically operate above the rotors first bending critical frequency and often near the second bending critical frequency. This sustained rubbing and heat generated thereby can cause thermal bowing of the rotor or exacerbate an existing bowed condition of the rotor. Accordingly, there is a need to minimize or eliminate the rotor dynamic and thermal constraints to the use of brush seals in steam turbine rotors to enable widespread use of brush seals in turbine seal locations previously constrained from such use.

BRIEF DESCRIPTION OF THE INVENTION

In accordance with the preferred embodiment of the present invention, there is provided an insert for securement on the rotor affording a raised annular continuous sealing surface in contact with the brush seal bristle tips to dissipate frictional heat without affecting rotor vibrational characteristics. Particularly, the rotor is provided with a locking device for locking a plurality of platform sealing segments about the rotor to form and thus locate the annular sealing surface in a position raised radially from the surface of the rotor. In this manner, heat is dissipated outwardly of the rotor surface with minimal or no thermal effect on the rotor. The locking device preferably includes at least one flange radially spaced from the rotor surface and having a plurality of axially extending teeth spaced circumferentially one from the other defining slots therebetween. A plurality of platform sealing segments are provided for securement to the locking device. Each platform segment has an arcuate sealing surface portion which, when the platform segments are secured to the locking device, form the continuous annular sealing surface engagable by the tips of the brush seal bristles. Each segment preferably includes a channel having in-turned flanges axially facing one another and having a plurality of circumferentially spaced teeth separated by slots.

To install the platform sealing segments, the teeth of the platform segments are aligned with the slots between the teeth of the locking device. When aligned, the segments are displaced radially inwardly to locate the teeth of the segments inwardly of the teeth of the locking device. It will be appreciated that when the segments are located in this manner, a continuous annular sealing surface is formed about the segments. To secure the segments to the locking device, the segments are rotated as a unit in a circumferential direction about the rotor axis to locate the platform sealing segment teeth radially inwardly of and in engagement with the overlying teeth of the locking device. The platform segments are assembled onto the rotor in a direction opposite to that of the rotor rotation. Stops at the end of the blind slots in the platform segments limit rotation of each segment. Additional locking of the segments to the rotor is not necessary but is desirable. By preferably locking one segment to the locking device, for example by employing one or more grub screws or by staking or welding the segment in place, circumferential rotation of the annular sealing platform relative to the rotor is precluded. It will be appreciated that the contact between the brush seal and the platform is located radially outwardly of the adjacent rotor surfaces thus dissipating the frictional heat outwardly of the rotor surface. Additionally, the platform sealing segment surfaces and locking device can be used on single and opposed flow steam turbines during retrofit.

In a preferred embodiment according to the present invention, there is provided a steam turbine comprising a rotor and a non-rotatable component about the rotor, a brush seal carried by the non-rotatable component, an arcuate sealing platform interposed between the brush seal and the rotor and having an arcuate seal surface, a locking device carried by the rotor, the locking device and the sealing platform having interengageable elements responsive to circumferential movement of the locking device and the platform relative to one another for locking the platform against radial outward movement relative to the rotor and the brush seal being engeagable with the arcuate seal surface to seal between the rotor and the non-rotatable component.

In a further preferred embodiment according to the present invention, there is provided a steam turbine comprising a rotor having adjacent rotor stages each including a plurality of buckets and a diaphragm about the rotor straddled by the buckets, a brush seal carried by the diaphragm, an arcuate sealing platform interposed between the brush seal and the rotor, the bucket stages and the platform having an arcuate seal surface raised radially outwardly of a rotor surface between the bucket stages, a locking device carried by the rotor for locking the platform against radial outward movement relative to the rotor, the brush seal being engageable with the arcuate seal surface to seal between the rotor and the non-rotatable component radially outwardly of the rotor surface enabling dissipation of frictionally generated heat by contact between the brush seal and the platform with minimal, if any, thermal effect on the rotor.

In a further preferred embodiment according to the present invention, there is provided in a steam turbine having a rotor and a non-rotatable component about the rotor carrying a brush seal for sealing between the rotor and the non-rotatable component, a method of installing a sealing platform on the rotor to afford a sealing surface for the brush seal comprising the steps of (a) providing a locking device at a predetermined axial position on the rotor, (b) providing platform segments having sealing surface portions at circumferential locations about the rotor substantially in radial registration with the locking device and (c) securing the segments to the rotor by engaging the segments with the locking device and rotating the segments relative to the locking device enabling the sealing surface portions of the platform segments to form a continuous uninterrupted annular sealing surface about the rotor for engagement with the brush seal.

DETAILED DESCRIPTION OF THE INVENTION

Figure 1:
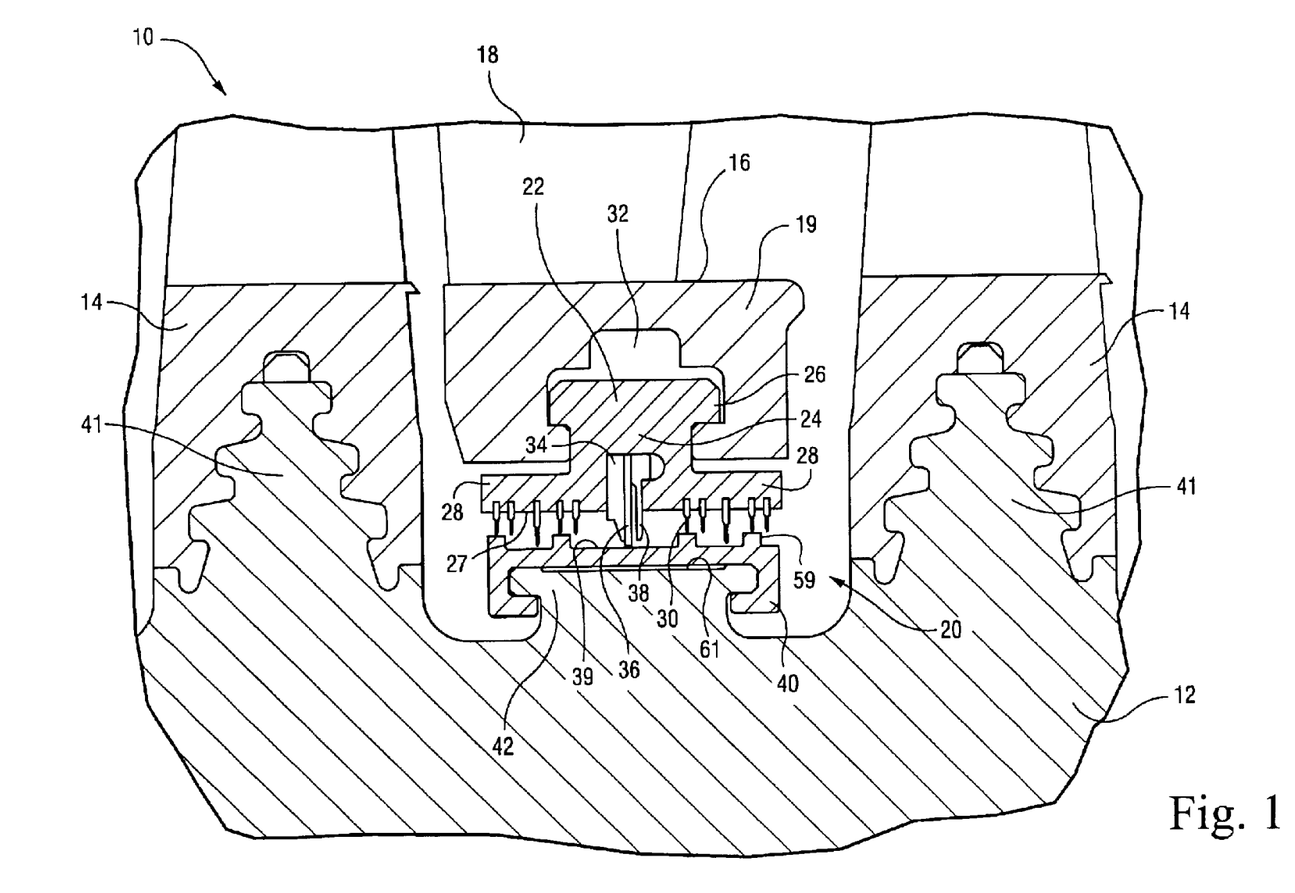
FIG. 1 is a fragmentary cross-sectional view of a diaphragm packing area of a steam turbine illustrating a brush seal in engagement with a platform sealing surface according to a preferred embodiment of the present invention.

Referring now to the drawings, particularly to FIG. 1 there is illustrated a portion of a steam turbine generally designated 10 including a rotor 12 mounting a plurality of circumferentially spaced steam turbine buckets 14 at axially spaced positions along the rotor and straddling a diaphragm 16. It will be appreciated that the diaphragm 16 includes a plurality of nozzle partitions 18 forming nozzles for the steam turbine. Diaphragm 16 also includes an inner web 19 carrying a diaphragm packing seal generally designated 20.

Packing seal 20 includes a plurality of circumferentially aligned packing ring segments 22 each having a neck 24, a pair of axially extending flanges 26 and an inner arcuate seal 27 comprised of axially extending flanges 28 mounting a plurality of radially inwardly directed labyrinth seal teeth 30. The seal segment 22 is carried in an arcuate generally complementary dovetail shaped groove 32 in the diaphragm 16. Packing ring segments 24 each mount a brush seal 34. Each brush seal 34 includes a plurality of, preferably metal, bristles 36 disposed between a pair of backing plates 38. It will be appreciated that brush seal 34 is disposed in an arcuate shaped groove in the packing ring segment 22 and that the brush seals are generally coextensive in a circumferential direction with the packing ring segment 22 carrying the brush seal.

Figure 2:
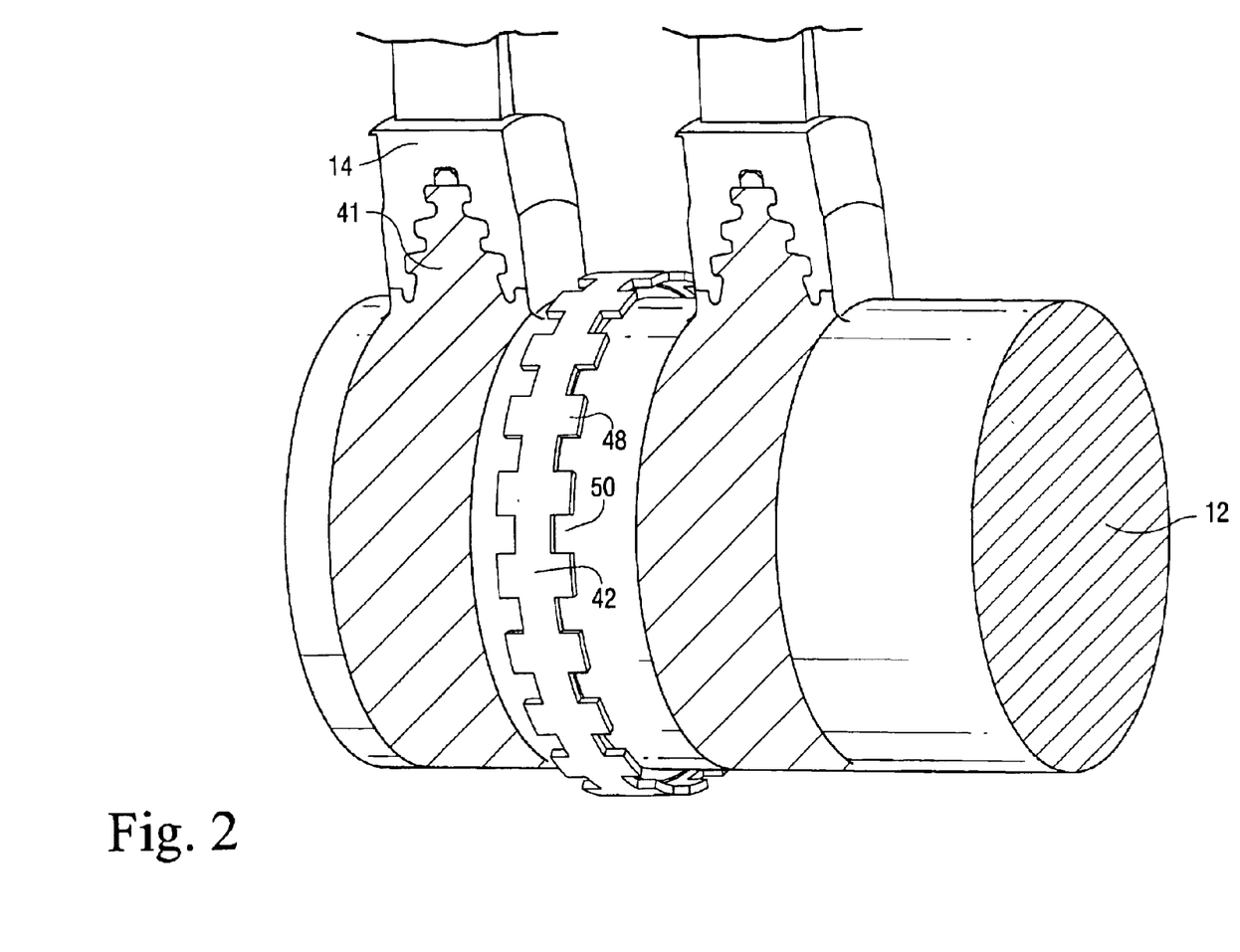
FIG. 2 is a fragmentary perspective view of the steam turbine rotor illustrating a locking device for locking the platform segments about the rotor.
Figure 3:
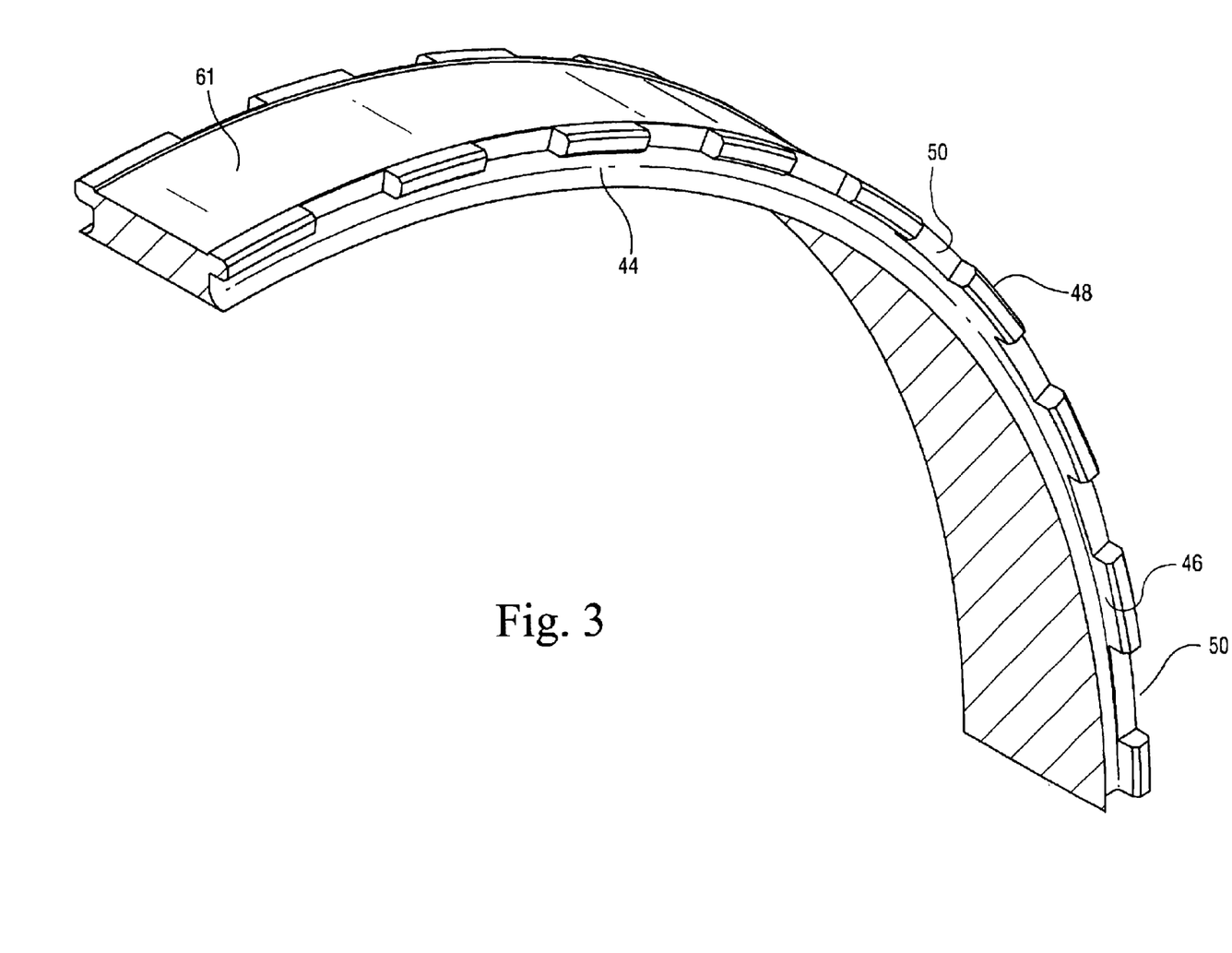
FIG. 3 is a perspective view as viewed from the underside of the locking device illustrating the locking device about the rotor.

As illustrated in FIG. 1, the bristles 36 of the brush seal 34 have tips in contact with a continuous annular sealing surface 39 formed on outer surface portions of a platform formed of a plurality of platform seal segments 40. Platform segments 40 are secured to a locking device 42 carried on the rotor 12 between the rotor dovetail rims 41 mounting the buckets 14. As illustrated in FIGS. 2 and 3, the locking device 42 includes a radially outwardly projecting rim or neck 44 formed circumferentially about the rotor between the wheels. The neck 44 terminates in axially oppositely extending flanges 46 (FIG. 3). Circumferentially spaced axially extending teeth 48 are formed in the flanges 46 and define axially oppositely opening slots 50 between teeth 48. The locking device 42 can be formed integrally with the rotor as illustrated or as a separate part comprising the neck and flanges for retrofitting on existing rotors, for example by welding the locking device to existing rotors. Locking device 42 may also be provided as part of an original equipment rotor with the locking device welded thereto. From a review of FIG. 2 it will be appreciated that the locking device 42 extends about the rotor for a full 360° with the teeth extending in axially opposite directions. The locking device 42 serves as a mounting for the plurality of platform sealing segments 40.

Figure 4:
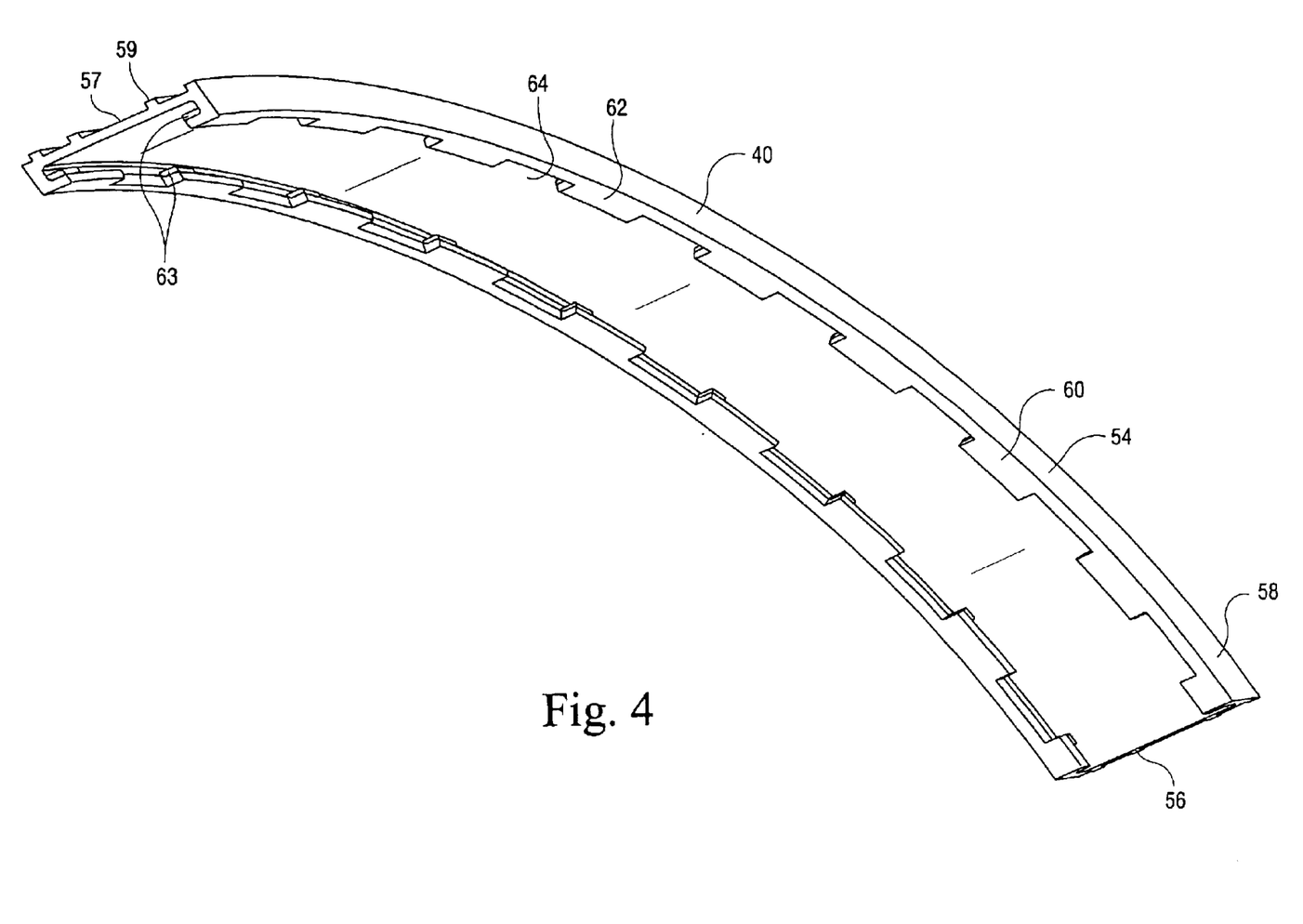
FIG. 4 is a perspective view of a platform sealing segment as viewed from its radially inner side.

Referring now to FIG. 4, each platform sealing segment 40 includes a generally channel-shaped body 54 including a base 56 having a sealing surface portion 57 along its outer surface, a pair of side walls 58 and flanges 60 directed axially toward one another. Flanges 60 have a plurality of teeth 62 circumferentially spaced one from the other and separated one from the other by slots 64. Stops 63 are provided at ends of the teeth 62 in the direction of rotation of the rotor, i.e. opposite to the direction of assembly as noted below. A plurality of segments 40 are provided for example four 90° segments or six segments of 60° each or any other suitable number of segments which will form the continuous annular sealing surface 39 when the segments 40 are secured about the rotor and surface portions 57 combine to form the annular sealing surface 39. It will be appreciated that the outer surface portions 57 of the base 56 thus serve as the contact surfaces for the bristle tips of the brush seal. The outer surface portions 57 of the platform segments also include raised ridges 59 which cooperate with the labyrinth seal teeth 30 in final assembly for enhanced labyrinth sealing.

Figure 5:
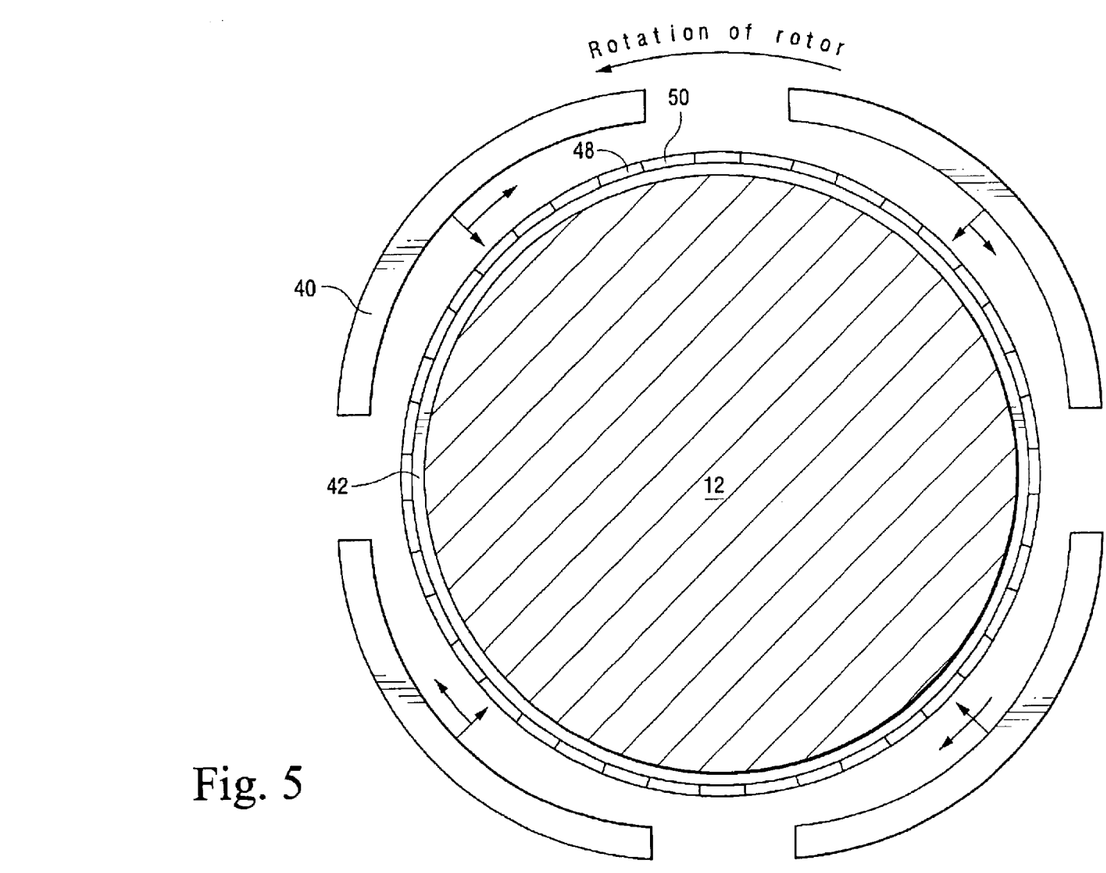
FIG. 5 is a schematic axial elevational view illustrating the platform segments about the locking device prior to completing the installation of the. segments onto the rotor.
Figure 6:
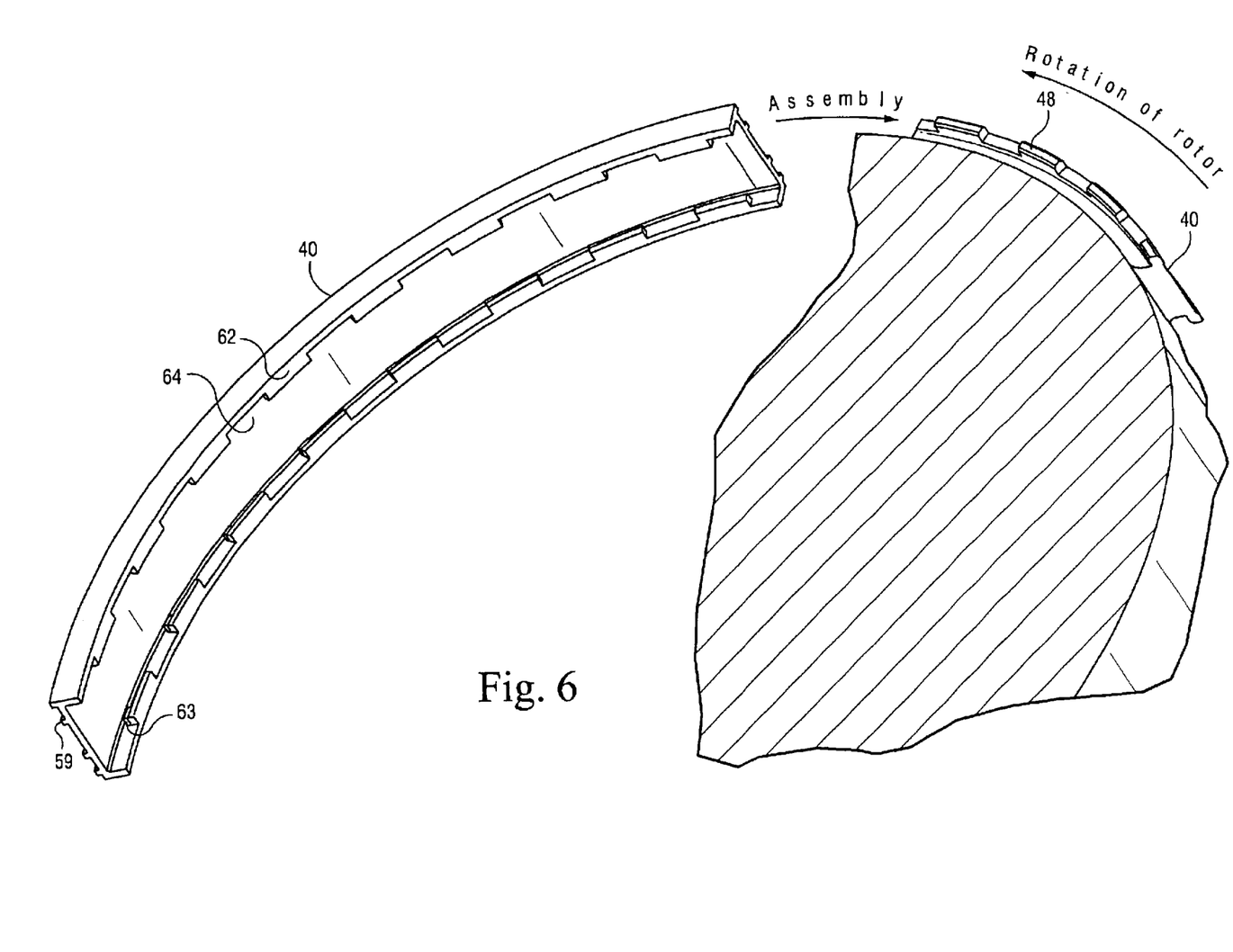
FIG. 6 is a fragmentary perspective view of the rotor, locking device and platform segment illustrating circumferential displacement of the platform relative to the locking device towards final securement.
Figure 7:
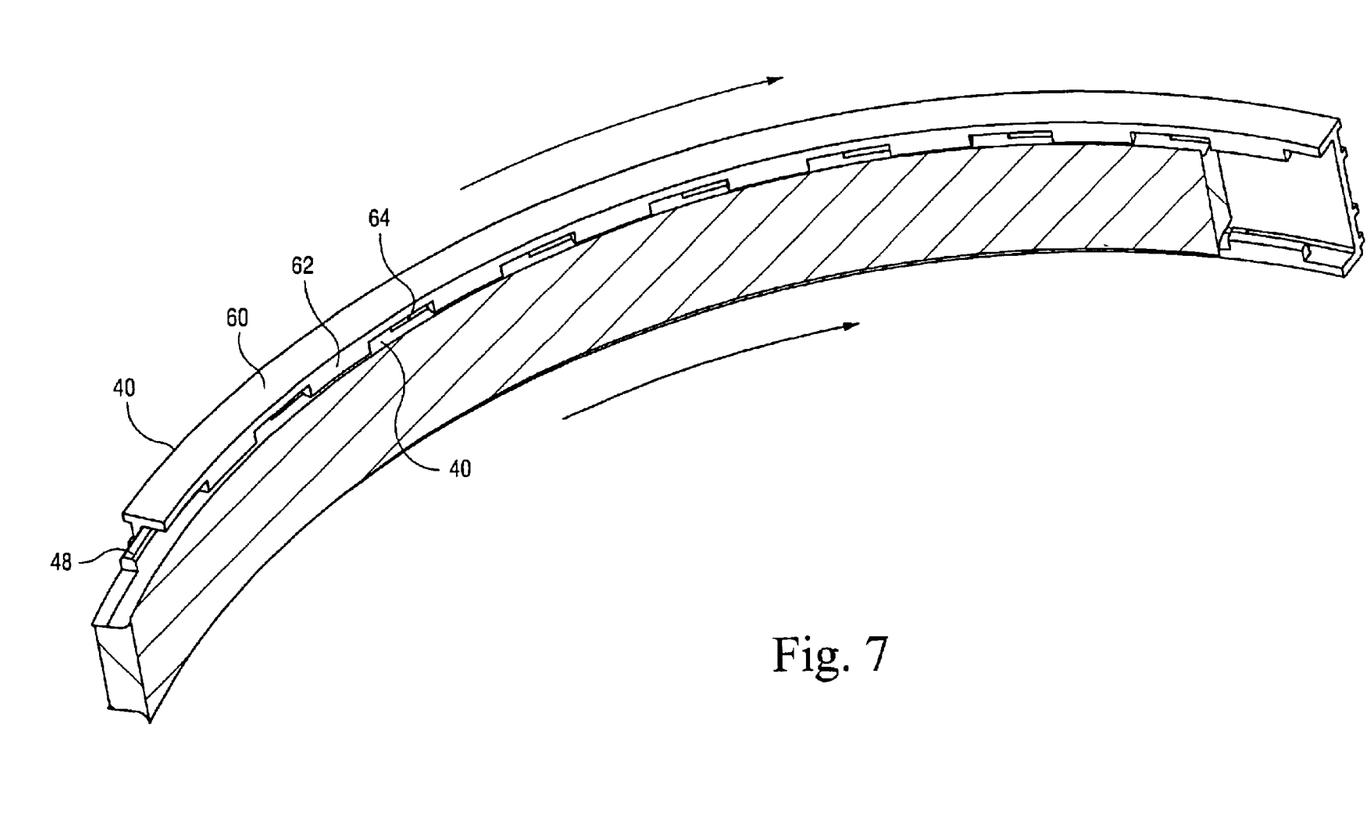
FIG. 7 is a perspective view illustrating the locking device and a platform segment movable circumferentially relative to one to the other in a direction towards final securement.
Figure 8:
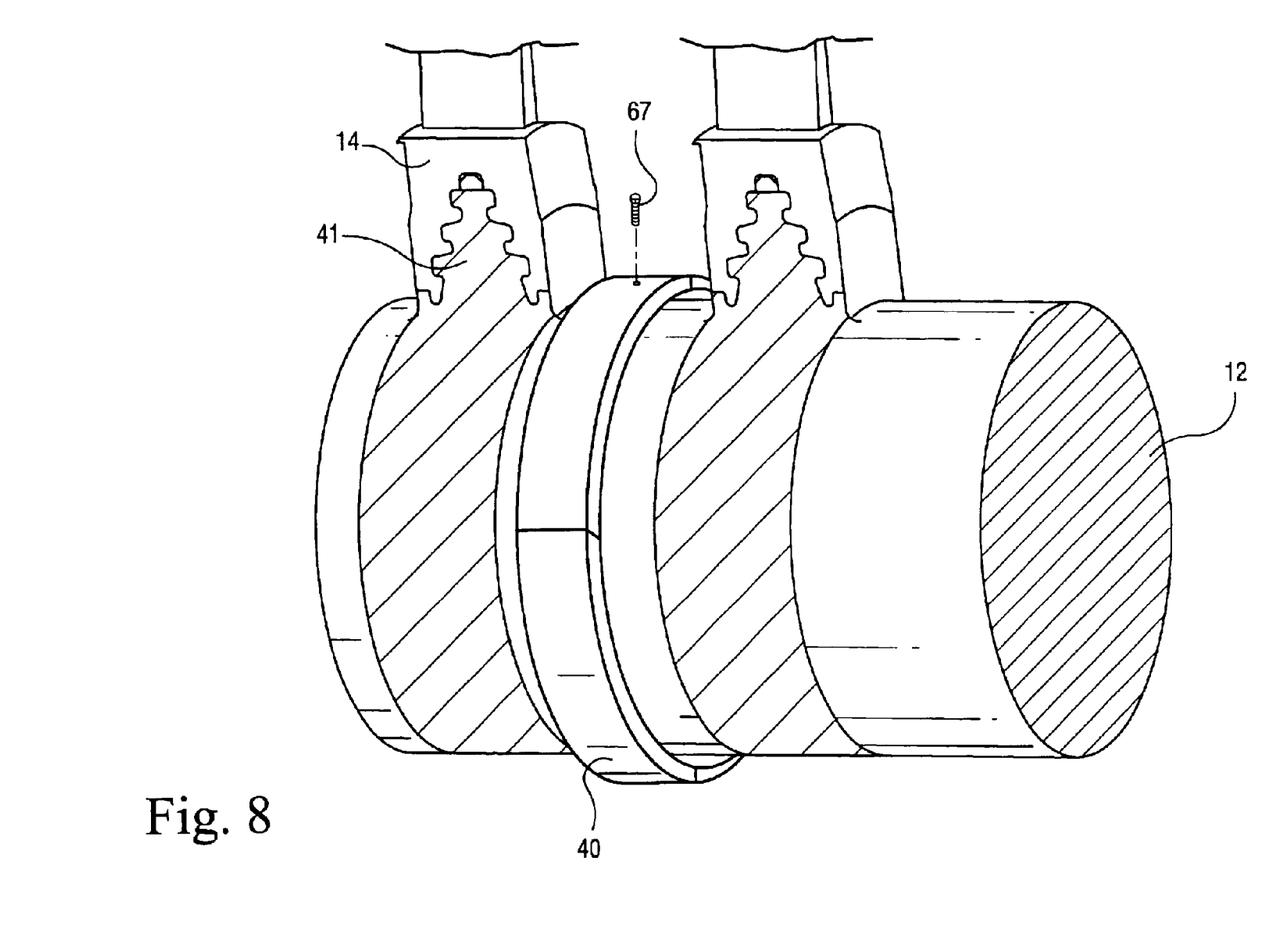
FIG. 8 is a view similar to FIG. 2 with the platform sealing segments secured to the locking device.
Figure 9:
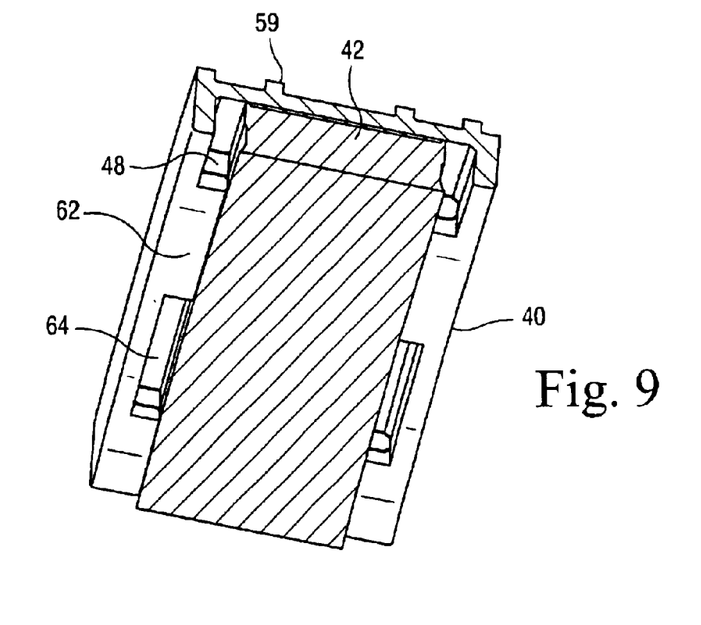
FIG. 9 is a fragmentary perspective view of the platform and locking device secured one to the other as viewed from the underside of the locking device.
Figure 10:
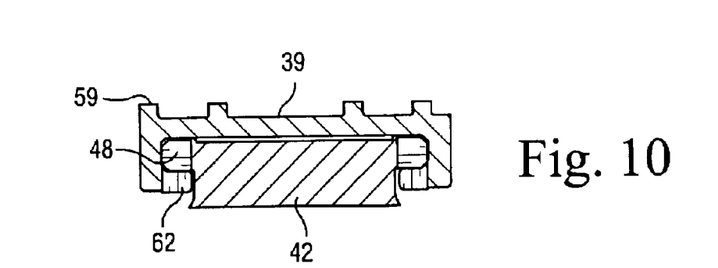
FIG. 10 is a cross-sectional view showing the platform and locking device in final securement.

Referring to FIGS. 5–8, there is illustrated a procedure for assembling the platform segments onto the locking device to provide the sealing interaction between the brush seal bristle tips and the platform sealing surface 39 at locations spaced radially outwardly of the rotor. To accomplish this, the platform sealing segments 40 are arrayed in radial opposition to the locking device 42 as illustrated in FIG. 5. By displacing the platform segments 40 radially inwardly with the teeth 62 thereof in registration with the slots 50 between the teeth 48 of the locking device, the flanges 60 of the platform segments can be located below, i.e. radially inwardly of the flanges 46 of the locking device 42. That is, the teeth 62 of the platform segments 40 pass through the slots 50 of the locking device and likewise the teeth 48 of the locking device pass through the slots 64 of the platform segments 40. With the flanges 60 registering below the flanges 46 of the locking device, the platform segments 40 can be rotated as a unit in a like circumferential direction to register the teeth 62 of the platform segments 40 radially inwardly of the teeth 48 of the locking device 42 as illustrated in FIG. 7. The direction of rotation of segments 40 upon installation is opposite to the direction of rotation of the rotor. Thus, stops 63 engage the ends of teeth 48 of locking device 42. The teeth 48 and 62 thus form interengaging elements for securing the platform segments and the locking device to one another. The extent of the circumferential displacement of the platform segments 40 generally corresponds to the width of a tooth 62 less the extent of stop 63.

It will be appreciated that the stops 63 engaging teeth 48 preclude relative rotation of the rotor and platform during turbine operation. However, it is preferred to secure the platform segments 40 to the rotor 12 thereby to positively prevent relative circumferential rotation of the rotor and platform segments. To accomplish this, at least one of the platform segments is secured to the locking device. For example, grub screws 67 (FIG. 8) may be applied through one platform segment into the locking device. Alternatively, the platform segment can be staked or welded to the locking device.

It will be appreciated that when finally installed, the surfaces 57 of the platform segments 40 combine to extend continuously about the rotor to form the annular sealing surface 39 engaged by the tips of the bristles of the brush seal. Consequently, the heat generated by the frictional contact between the brush seal bristle tips and the platform segments is located radially outwardly of the adjacent surface of the rotor. Additionally, as illustrated in FIG. 1, the locking device may have a recess 61 along its outer surface to form a gap between the locking device and the underside of the platform segments. This gap further insulates the heat generated by the frictional contact of the bristles and the platform segment from the rotor. It will also be appreciated that because the locking device itself projects from the rotor surface, thermal expansion or contraction of the locking device per se does not have an effect on the rotor, i.e., does not tend to bow the rotor due to differential heat being applied about the rotor. It will thus be appreciated that by providing platform sealing segments as described, the segments afford a raised platform and continuous sealing surface for sealing contact between the brush bristles and the rotor which enables dissipation of the generated frictional heat without affecting rotor vibrational characteristics while simultaneously enabling application and placement of brush seals in turbine locations which result in superior sealing performance as compared with labyrinth-type packing seals which affords significant improvement in turbine performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:
    a rotor and a non-rotatable component about said rotor;
    a brush seal carried by the non-rotatable component;
    an arcuate sealing platform interposed between said brush seal and said rotor and having an arcuate seal surface;
    a locking device carried by said rotor;
    said locking device and said sealing platform having interengagable elements responsive to circumferential movement of said locking device and said platform relative to one another for locking said platform against radial outward movement relative to said rotor; and
    said brush seal being engagable with said arcuate seal surface to seal between said rotor and said non-rotatable component;
    said locking device and said platform including a plurality of teeth separated by a plurality of slots, the teeth of one of said locking device and said plaform being receivable through the slots of another of said locking device and said platform, said teeth being engageable with one another in response to movement of said platform relative to said locking device in a circumferential direction to preclude radial outward movement of said platform relative to said rotor;
    a stop carried by a tooth of one of said locking device and said platform engagable against a tooth of another of said locking device and said platform to preclude relative rotation of said rotor and said platform in one direction.

2. A turbine according to claim 1 including a weld between said locking device and said platform in said locked position of said platform for preventing relative circumferential movement of said locking device and said platform.

3. A turbine comprising:
    a rotor and a non-rotatable component about said rotor;
    a brush seal carried by the non-rotatable component;
    an arcuate sealing platform interposed between said brush seal and said rotor and having an arcuate seal surface;
    a locking device carried by said rotor;
    said locking device and said sealing platform having interengagable elements responsive to circumferential movement of said locking device and said platform relative to one another for locking said platform against radial outward movement relative to said rotor; and
    said brush seal being engagable with said arcuate seal surface to seal between said rotor and said non-rotatable component,
    said locking device and said platform including a plurality of teeth separated by a plurality of slots, the teeth of one of said locking device and said platform being receivable through the slots of another of said locking device and said platform, said teeth being engagable with one another in response to movement of said platform relative to said locking device in a circumferential direction to preclude radial outward movement of said platform relative to said rotor;
    said locking device and said platform being staked to one another in said locked position thereof for preventing relative circumferential movement of said locking device and said platform.

4. A turbine according to claim 1 including a screw for securing said platform and said locking device to one another for preventing relative circumferential movement of said locking device and said platform.

5. In a turbine having a rotor and a non-rotatable component about the rotor carrying a brush seal for sealing between the rotor and the non-rotatable component, a method of installing a sealing platform on the rotor to afford a sealing surface for the brush seal comprising the steps of:
    (a) providing a locking device at a predetermined axial position on said rotor;
    (b) providing platform segments having sealing surface portions at circumferential locations about the rotor substantially in radial registration with the locking device; and
    (c) securing said segments to said rotor by engaging the segments with the locking device and rotating the segments relative to the locking device enabling said sealing surface portions of said platform segments to form a continuous uninterrupted annular sealing surface about the rotor for engagement with the brush seal;

wherein step (a) includes forming the locking device with a first plurality of teeth extending in at least one axial direction on an axially extending flange radially outwardly of adjacent surface portions of the rotor, the first teeth being spaced one from the other to form slots therebetween, step (b) includes forming each segment with a plurality of second teeth extending in an axial direction opposite to said one axial direction, the second teeth of each segment being spaced from one another to form slots therebetween and step (c) includes passing the second teeth of said platform segments through the slots between said first teeth, passing the first teeth of the locking device through the slots between said second teeth and rotating the platform segments and the locking device relative to one another to locate the second teeth between the first teeth and the rotor surface;

step (c) further including welding at least one segment and the locking device to one another to retain the platform segments on the rotor.

\* \* \* \* \*